US012784605B2

(12) United States Patent
Kawakami et al.

(10) Patent No.: US 12,784,605 B2
(45) Date of Patent: Nov. 3, 2026

(54) ASSIST SYSTEM, ASSIST METHOD, AND ASSIST PROGRAM

(71) Applicant: DWANGO Co., Ltd., Tokyo (JP)

(72) Inventors: Nobuo Kawakami, Tokyo (JP); Yuri Odagiri, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 466 days.

(21) Appl. No.: 17/998,383

(22) PCT Filed: Sep. 1, 2021

(86) PCT No.: PCT/JP2021/032165
§ 371 (c)(1),
(2) Date: Nov. 10, 2022

(87) PCT Pub. No.: WO2022/070747
PCT Pub. Date: Apr. 7, 2022

(65) Prior Publication Data
US 2023/0360548 A1 Nov. 9, 2023

(30) Foreign Application Priority Data
Sep. 30, 2020 (JP) ................................ 2020-166484

(51) Int. Cl.
*G09B 5/02* (2006.01)
*G09B 5/08* (2006.01)

(52) U.S. Cl.
CPC ................ *G09B 5/02* (2013.01); *G09B 5/08* (2013.01)

(58) Field of Classification Search
CPC . G09B 5/02; G09B 5/08; G09B 19/00; G06Q 50/20
See application file for complete search history.

(56) References Cited

U.S. PATENT DOCUMENTS 10,657,836 B2 * 5/2020 Asano ...................... G09B 5/08
11,699,358 B2 * 7/2023 Monson ................ G09B 19/00 434/263

(Continued)

FOREIGN PATENT DOCUMENTS

CN 110623629 A 12/2019
JP H05265369 A 10/1993
JP 2013200440 A 10/2013
JP 2016009424 A 1/2016

(Continued)

OTHER PUBLICATIONS

[English translation] Notice of First Opinion Review for Chinese Patent Application No. 202180032586.8 dated Aug. 14, 2024, pp. all.

(Continued)

*Primary Examiner* — Eddy Saint-Vil
(74) *Attorney, Agent, or Firm* — Dorsey & Whitney LLP

(57) ABSTRACT

An assist system in one embodiment includes at least one processor. The at least one processor: obtains target data indicating a target user viewpoint movement on a screen displaying target content; refers to a storage unit storing correlation data indicating a correlation between a user viewpoint movement and a user understanding level for content and assist information corresponding to the user understanding level for the content, wherein the correlation data is obtained through statistical processing of a plurality of sets of sample data obtained from a plurality of sample users, each of the plurality of sets of sample data indicating a pair of: a viewpoint movement of a sample user among the plurality of the sample users having visually recognized the sample content; and an understanding level of the sample user for the sample content; estimates a target user understanding level based on the target data and the correlation data; and outputs the assist information corresponding to the target user understanding level estimated.

15 Claims, 10 Drawing Sheets

(56) References Cited

U.S. PATENT DOCUMENTS

| | | | | |
|---|---|---|---|---|
| 11,756,449 | B2 * | 9/2023 | Allen | G09B 5/02<br>434/178 |
| 2013/0027429 | A1 * | 1/2013 | Hogg | G06T 19/006<br>345/633 |
| 2014/0272901 | A1 * | 9/2014 | Hebbar | G09B 5/08<br>434/362 |
| 2016/0005320 | A1 * | 1/2016 | deCharms | G09B 19/00<br>434/236 |
| 2017/0098387 | A1 * | 4/2017 | Cama | G09B 19/0092 |
| 2017/0337160 | A1 * | 11/2017 | Terada | G09B 5/02 |
| 2018/0350252 | A1 * | 12/2018 | Takada | G09B 19/025 |

FOREIGN PATENT DOCUMENTS

| | | | |
|---|---|---|---|
| JP | 2020126214 | A | 8/2020 |
| JP | 6980883 | B1 | 11/2021 |
| JP | 2022057958 | A | 4/2022 |
| WO | 2022070747 | A1 | 4/2022 |

OTHER PUBLICATIONS

International Search Report and Written Opinion (English Translation for ISR only) mailed on Nov. 9, 2021 for International Patent Application No. PCT/JP2021/032165, pp. all.

Fujiyoshi, Hiroki , et al., "An Experimental Investigation of English Proficiency Estimation Methods by Using Viewpoint Information", Technical Report of IEICE vol. 115 No. 517; The Institute of Electronics, Information and Communication Engineers;, Mar. 17, 2016, 6 pages.

* cited by examiner

ASSIST SYSTEM, ASSIST METHOD, AND ASSIST PROGRAM

CROSS REFERENCE TO RELATED APPLICATION(S)

This application is a U.S. National Stage filing under 35 U.S.C. § 371 of PCT Application No. PCT/JP2021/032165, filed Sep. 1, 2021, which claims priority to Japanese Application No. 2020-166484, filed Sep. 30, 2020, which are incorporated herein by reference, in their entirety, for any purpose.

TECHNICAL FIELD

An aspect of the present disclosure relates to an assist system, an assist method, and an assist program.

BACKGROUND ART

A technique for assisting a user who visually recognizes content is known. For example, Patent Document 1 describes a learning assist device to assist in learning to read a foreign language. This learning assist device tracks the eye movements of learners as they read a task foreign language sentence, calculates the frequency of rereading and eye-stopping, and presents information about the rereading frequency and eye-stopping to the instructor. Patent Documents 2 to 6 also describe techniques related to user assistance.

CITATION LIST

Patent Documents

Patent Document 1: Japanese Unexamined Patent Publication No. 2005-338173

Patent Document 2: Japanese Unexamined Patent Publication No. 2010-039646

Patent Document 3: Japanese Unexamined Patent Publication No. 2016-114684

Patent Document 4: Japanese Unexamined Patent Publication No. 2018-097266

Patent Document 5: Japanese Patent Publication No. 6636670

Patent Document 6: Japanese Unexamined Patent Publication No. 2014-194637

SUMMARY OF THE INVENTION

Technical Problem

A method that can appropriately assist users in viewing content is desired.

Solution to the Problems

An assist system according to an aspect of the present disclosure includes at least one processor. The at least one processor is configured to: obtain target data indicating a target user viewpoint movement on a screen displaying a target content; refer to a storage unit storing correlation data indicating a correlation between a user viewpoint movement and a user understanding level for content and assist information corresponding to the user understanding level for the content, wherein the correlation data is obtained through statistical processing of a plurality of sets of sample data obtained from a plurality of sample users having visually recognized sample content, each of the plurality of sets of sample data indicating a pair of: a viewpoint movement of a sample user among the plurality of the sample users having visually recognized the sample content; and an understanding level of the sample user for the sample content; estimate a target user understanding level for the target content based on the target data and the correlation data; and output the assist information corresponding to the estimated understanding level of the target user.

In such an aspect, the correlation data is generated through statistical processing of the sample data obtained from the sample user, and the target user understanding level is estimated based on the correlation data and the target data indicating the target user viewpoint movement with respect to the target content. By using the correlation data obtained through the statistical processing, the target user understanding level is estimated based on the actual tendency of the user who visually recognizes content. Outputting assist information based on this estimation allows appropriate assistance of the target user who visually recognizes the target content.

Advantages of the Invention

The aspect of the present disclosure allows appropriate assistance of a user who visually recognizes content.

DESCRIPTION OF EMBODIMENT

Figure 1:
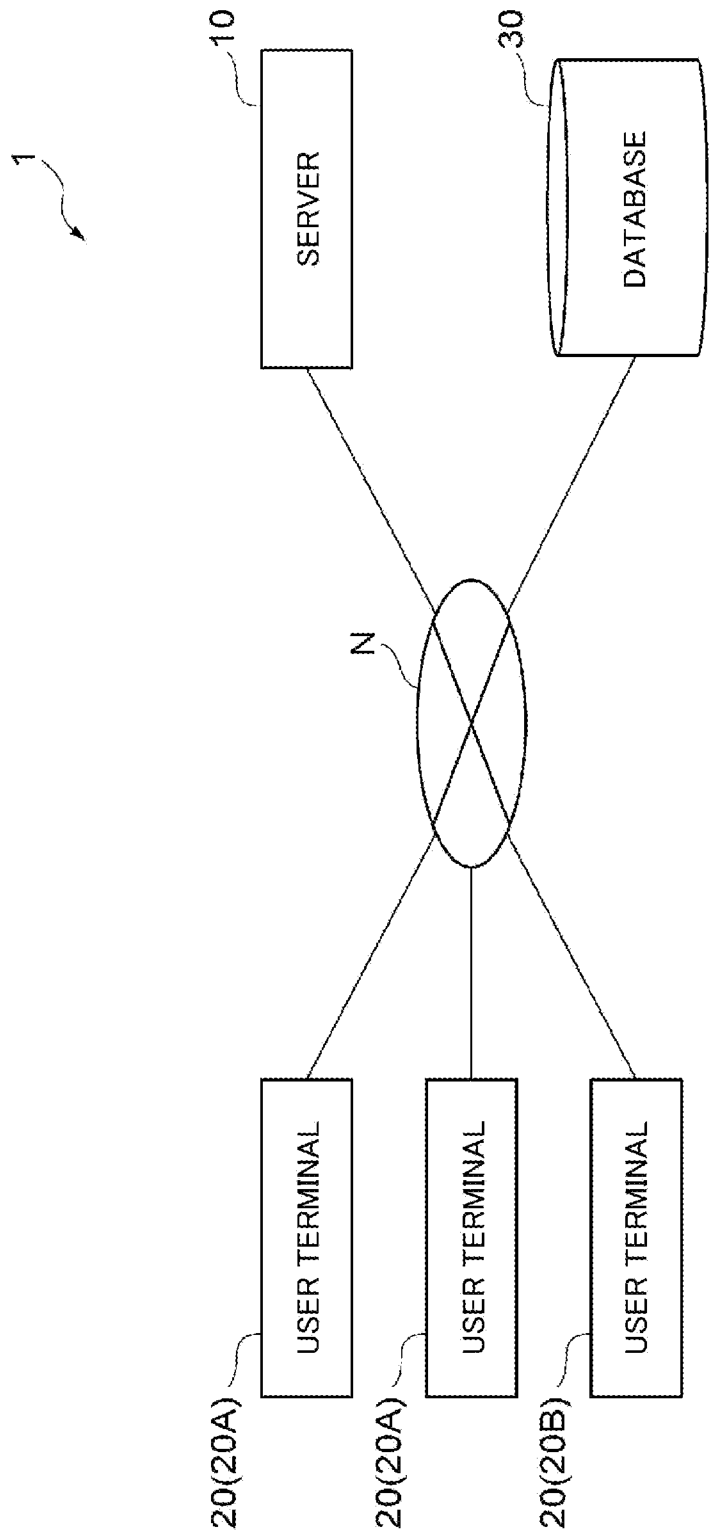
FIG. 1 is a diagram illustrating an exemplary application of an assist system in accordance with an embodiment.

Embodiments of the present disclosure will be described in detail below with reference to the attached drawings. In the description of the drawings, the same or equivalent elements are denoted by the same reference characters, and the description therefor is not repeated.

[Overview of System]

The assist system related to an embodiment is a computer system that assists a user who visually recognizes content. The content herein refers to information in a human-recognizable form, which is provided by a computer or computer system. Electronic data representing the content is referred to as content data. No particular limitation is imposed on the form of expressing the content and the content may be expressed, for example, in the form of documents, images (e.g., photographs and videos), or a combination thereof. No particular limitation is imposed on the purpose and the usage scenes for the content, and the content may be utilized for a variety of purposes such as, for example, education, news, lecture, commercial transaction, entertainment, medical treatment, game, and chat.

The assist system provides the content to a user by transmitting the content data to a user terminal. The user is a person who seeks to obtain information from the assist system, that is, a viewer of the content. The user terminal may also be referred to as a "viewer terminal". The assist system may provide the content data to the user terminal in response to a request from the user, or may provide the content data to the user terminal based on an instruction from a distributor apart from the user. The distributor is a person who intends to convey information to a user (viewer), that is, a sender of content.

The assist system provides the user not only with the content but also with assist information corresponding to a user understanding level, as needed. The user understanding level is an indicator of the user understanding level for the content. For example, in a case where the content contains a sentence, the user understanding level may be an indicator of how much the user understands the sentence (e.g., whether or not the user understands the meaning of the words in the sentence or whether or not the user understands the grammar of the sentence). The assist information is information for promoting the user understanding for the content. For example, in a case where the content contains a sentence, the assist information may be information indicating a meaning of each word in the sentence, a grammar of the sentence, or the like. In the following description, a user whose understanding level is to be estimated (in other words, a user to whom assist information is to be provided as needed) is referred to as a target user, and the content visually recognized by the target user is referred to as target content.

To output the assist information, the assist system estimates the target user understanding level based on the target user viewpoint movement on the screen displaying the target content. Specifically, the assist system refers to correlation data indicating a correlation between the user viewpoint movement and the user understanding level. The correlation data is electronic data generated by performing statistical processing on sample data acquired in advance. Sample data is electronic data indicating a pair of the movement of the user viewpoint while he or she visually recognizes the content and the user understanding level for the content. In the following description, a user who provides sample data for generating correlation data is referred to as a sample user, and content visually recognized by the sample user is referred to as sample content.

The assist system acquires data indicating the target user viewpoint movement from the user terminal of the target user. The data indicating the viewpoint movement is data indicating how the user viewpoint has moved on the screen of the user terminal, and is also referred to as viewpoint data in the present disclosure. In the following, data indicating the target user viewpoint movement (that is, viewpoint data of the target user) is referred to as target data. The assist system estimates the target user understanding level by using the correlation data and the target data. The assist system then outputs assist information corresponding to the target user understanding level to the user terminal of the target user as needed.

The present disclosure may collectively refer the sample user and the target user as the user, where the sample user and the target user do not need to be distinguished from each other.

The viewpoint data is acquired by an eye tracking system. The eye tracking system identifies user viewpoint coordinates at each given time interval based on the movements of the user's eyes, and obtains viewpoint data indicating coordinates of a plurality of viewpoints in a time sequence. The viewpoint coordinates are coordinates indicating the position of the viewpoint on the user terminal screen. The viewpoint coordinates may be represented using a two-dimensional coordinate system. The eye tracking system may be mounted on the user terminal or may be mounted on another computer separate from the user terminal. Alternatively, the tracking system may be implemented by the user terminal in cooperation with another computer.

The eye tracking system performs calibration that is a process for more accurately identifying the viewpoint coordinates of the user. In one example, the eye tracking system first sets a partial area of the content displayed on the screen of the user terminal as a guidance area for the user to gaze at. Hereinafter, the content in which the guidance area is set is referred to as first content. The eye tracking system then identifies the coordinates of the viewpoint of the user gazing at the guidance area as the first viewpoint coordinates based on the user's eye movements, and calculates the difference between the first viewpoint coordinates and the area coordinates of the guidance area. The area coordinates of the guidance area are coordinates indicating the position of the guidance area on the screen of the user terminal. The eye tracking system then identifies the coordinates of the viewpoint of the user looking at the second content as the second viewpoint coordinates based on the user's eye movements while the user visually recognizes the content displayed on the screen of the user terminal (second content). The eye tracking system then calibrates the second viewpoint coordinates identified by using the pre-calculated difference. The second content is content that the user is looking at while the second viewpoint coordinates are calibrated.

As described above, the purpose and the usage scenes of the content are not limited. In the present embodiment, educational content is shown as an exemplary content, and the assist system assists a student who visually recognizes the educational content. Therefore, the target content is "target content for education", and the sample content is "sample content for education". The educational content is content used to educate students, and may be, for example, tests such as exercise questions and examination questions, or textbooks. The educational content may include a sentence, a mathematical expression, a graph, a figure, or the like. The term "student" refers to a person who receives teaching such as academic work and handicraft. The student is an example of a user (viewer). As described above, the distribution of the content to the viewer may be performed based on an instruction of the distributor. If the content is educational content, the distributor may be a teacher. The teacher refers to a person who teaches schoolwork, techniques, and the like to students. The teacher may be a person with a teacher's license or a person without a teacher's license. The age and affiliation are not limited for each of the teacher and student. Therefore, the purpose and the usage scenes of the educational content are not limited. For example, the educational content may be used in various schools such as nursery schools, kindergarten schools, elementary schools, junior high schools, high schools, universities, graduates, specialty schools, preparatory schools, and online schools, or may be used in places or scenes other than schools. In this regard, educational content may be used for a variety of purposes, such as infant education, compulsory education, higher education, lifelong learning, and the like. Further, the educational content includes not only content used in school education but also content used in a seminar or a training scene of a company or the like.

[System Configuration]

FIG. 1 is a diagram illustrating an exemplary application of an assist system 1 in accordance with an embodiment. In the present embodiment, the assist system 1 includes a server 10. The server 10 is connected to and in communication with a user terminal 20 and a database 30 via a communication network N. The configuration of the communication network N is not limited. For example, the communication network N may include the Internet or an intranet.

The server 10 is a computer that distributes content to the user terminal 20 and provides assist information to the user terminal 20 as needed. The server 10 may be configured by one or more computers.

The user terminal 20 is a computer used by a user. In the present embodiment, the user is a student who views educational content. In one example, the user terminal 20 has a function of accessing the assist system 1 to receive and display content data and assist information, and a function of transmitting viewpoint data to the assist system 1. The type of the user terminal 20 is not limited, and may be, for example, a mobile terminal such as a high-function mobile phone (smartphone), a tablet terminal, a wearable terminal (e.g., a head-mounted display (HMD), smart glasses, or the like), a laptop personal computer, or a mobile phone. Alternatively, the user terminal 20 may be a stationary terminal such as a desktop personal computer. Although three user terminals 20 are shown in FIG. 1, the number of user terminals 20 is not limited. In the present embodiment, when the terminal of the sample user and the terminal of the target user are distinguished from each other, the terminal of the sample user is referred to as a "user terminal 20A", and the terminal of the target user is referred to as a "user terminal 20B". The user can operate the user terminal 20 to log in to the assist system 1 and view content. In the present embodiment, it is assumed that the user of the assist system 1 has already logged in.

The database 30 is a non-transitory storage device that stores data used by the assist system 1. In the present embodiment, the database 30 stores content data, sample data, correlation data, and assist information. The database 30 may be a single database or a collection of multiple databases.

Figure 2:
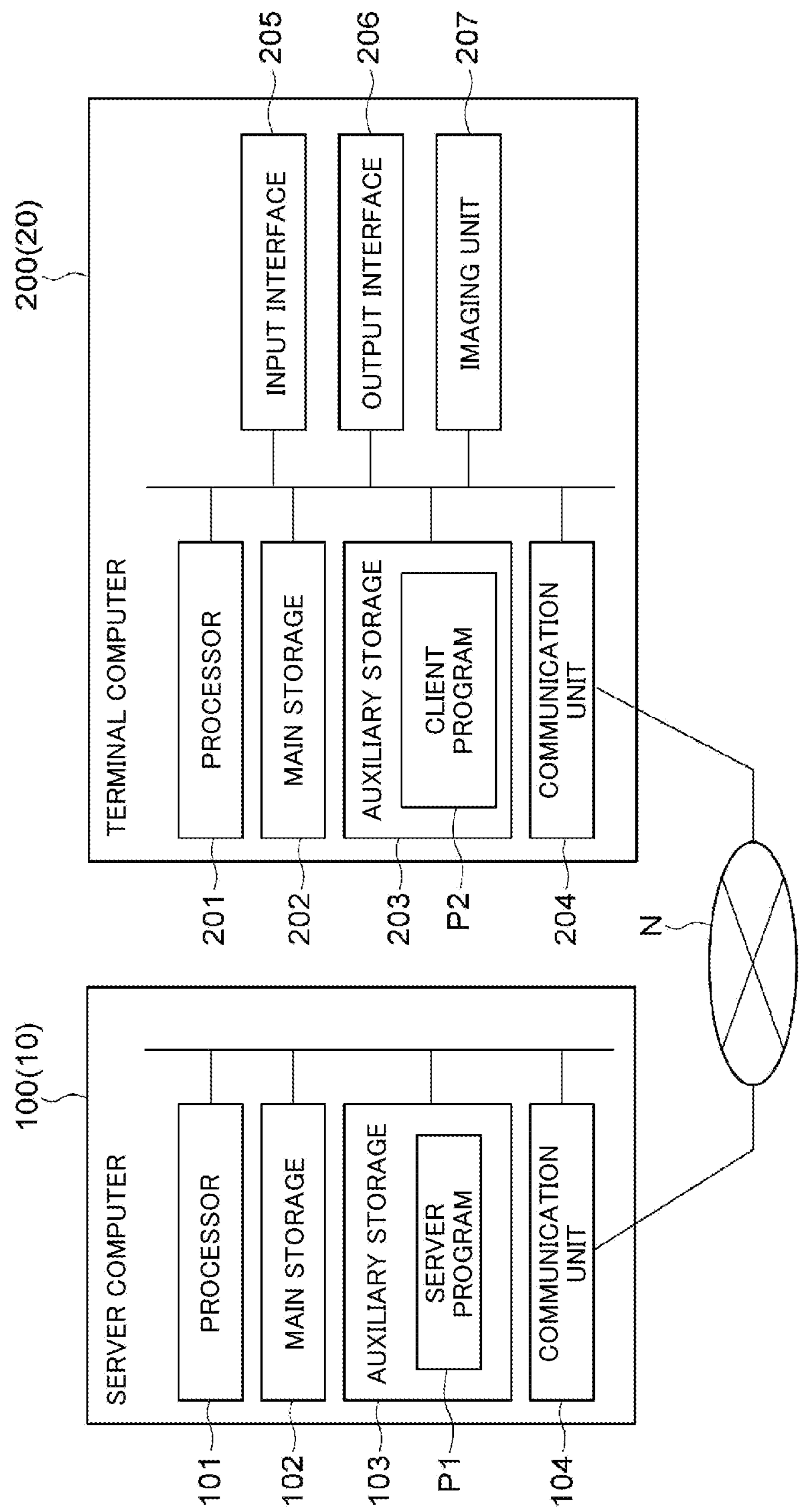
FIG. 2 is a diagram illustrating an exemplary hardware configuration related to the assist system according to the embodiment.

FIG. 2 is a diagram illustrating an exemplary hardware configuration related to the assist system 1. FIG. 2 shows a server computer 100 serving as the server 10, and a terminal computer 200 serving as the user terminal 20.

For example, the server computer 100 includes a processor 101, a main storage 102, an auxiliary storage 103, and a communication unit 104 as hardware components.

The processor 101 is a computing device that executes an operating system and application programs. Examples of the processor include a central processing unit (CPU) and a graphics processing unit (GPU). However, the type of the processor 101 is not limited to these.

The main storage 102 is a device that stores a program for achieving the server 10, computation results output from the processor 101, and the like. The main storage 102 is configured by, for example, at least one of a read-only memory (ROM) or random access memory (RAM).

The auxiliary storage 103 is generally a device capable of storing a larger amount of data than the main storage 102. The auxiliary storage 103 is configured by a non-volatile storage medium such as a hard disk or a flash memory. The auxiliary storage 103 stores a server program P1 that causes the server computer 100 to function as the server 10 and stores various types of data. In the present embodiment, the assist program is implemented as a server program P1.

The communication unit 104 is a device that executes data communication with another computer via the communication network N. The communication unit 104 is configured by, for example, a network card or a wireless communication module.

Each functional element of the server 10 is achieved by causing the processor 101 or the main storage 102 to read the server program P1 and causing the processor 101 to execute the program. The server program P1 includes codes that achieve the functional elements of the server 10. The processor 101 operates the communication unit 104 according to the server program P1, and executes reading and writing of data from and to the main storage 102 or the auxiliary storage 103. Through such processing, each functional element of the server 10 is achieved.

The server 10 may be configured by one or more computers. In a case of using a plurality of computers, the computers are connected to each other via the communication network N, thereby logically configuring single server 10.

In one example, the terminal computer 200 includes, as hardware components, a processor 201, a main storage 202, an auxiliary storage 203, a communication unit 204, an input interface 205, an output interface 206, and an imaging unit 207.

The processor 201 is a computing device that executes an operating system and application programs. The processor 201 may be, for example, a CPU or a GPU, but the type of the processor 201 is not limited to these.

The main storage 202 is a device that stores a program for achieving the user terminal 20, computation results output from the processor 201, and the like. The main storage 202 is configured by, for example, at least one of ROM or RAM.

The auxiliary storage 203 is generally a device capable of storing a larger amount of data than the main storage 202. The auxiliary storage 203 is configured by a non-volatile storage medium such as a hard disk or a flash memory. The auxiliary storage 203 stores a client program P2 for causing the terminal computer 200 to function as the user terminal 20, and various data.

The communication unit 204 is a device that executes data communication with another computer via the communication network N. The communication unit 204 is configured by, for example, a network card or a wireless communication module.

The input interface 205 is a device that receives data based on a user's operation or action. For example, the input interface 205 is configured by at least one of a keyboard, an operation button, a pointing device, a touch panel, a microphone, a sensor, or a camera.

The output interface 206 is a device that outputs data processed by the terminal computer 200. For example, the output interface 206 is configured by at least one of a monitor, a touch panel, an HMD, or a speaker.

The imaging unit 207 is a device that captures an image of the real world, and is a camera, specifically. The imaging unit 207 may capture a moving image (video) or a still image (photograph). The imaging unit 207 can also function as the input interface 205.

Each functional element of the user terminals 20 is achieved by causing the processor 201 or the main storage 202 to read the client program P2 and causing the processor 201 to execute the program. The client program P2 includes code for achieving each functional element of the user terminal 20. The processor 201 operates the communication unit 204, the input interface 205, the output interface 206, or the imaging unit 207 in accordance with the client program P2 to read and write data from and to the main storage 202 or the auxiliary storage 203. Through this processing, each functional element of the user terminal 20 is achieved.

At least one of the server program P1 or the client program P2 may be provided after being non-temporarily recorded on a tangible recording medium such as a CD-ROM, a DVD-ROM, or a semiconductor memory. Alternatively, at least one of these programs may be provided via a communication network N as a data signal superimposed on a carrier wave. These programs may be separately provided or may be provided together.

Figure 3:
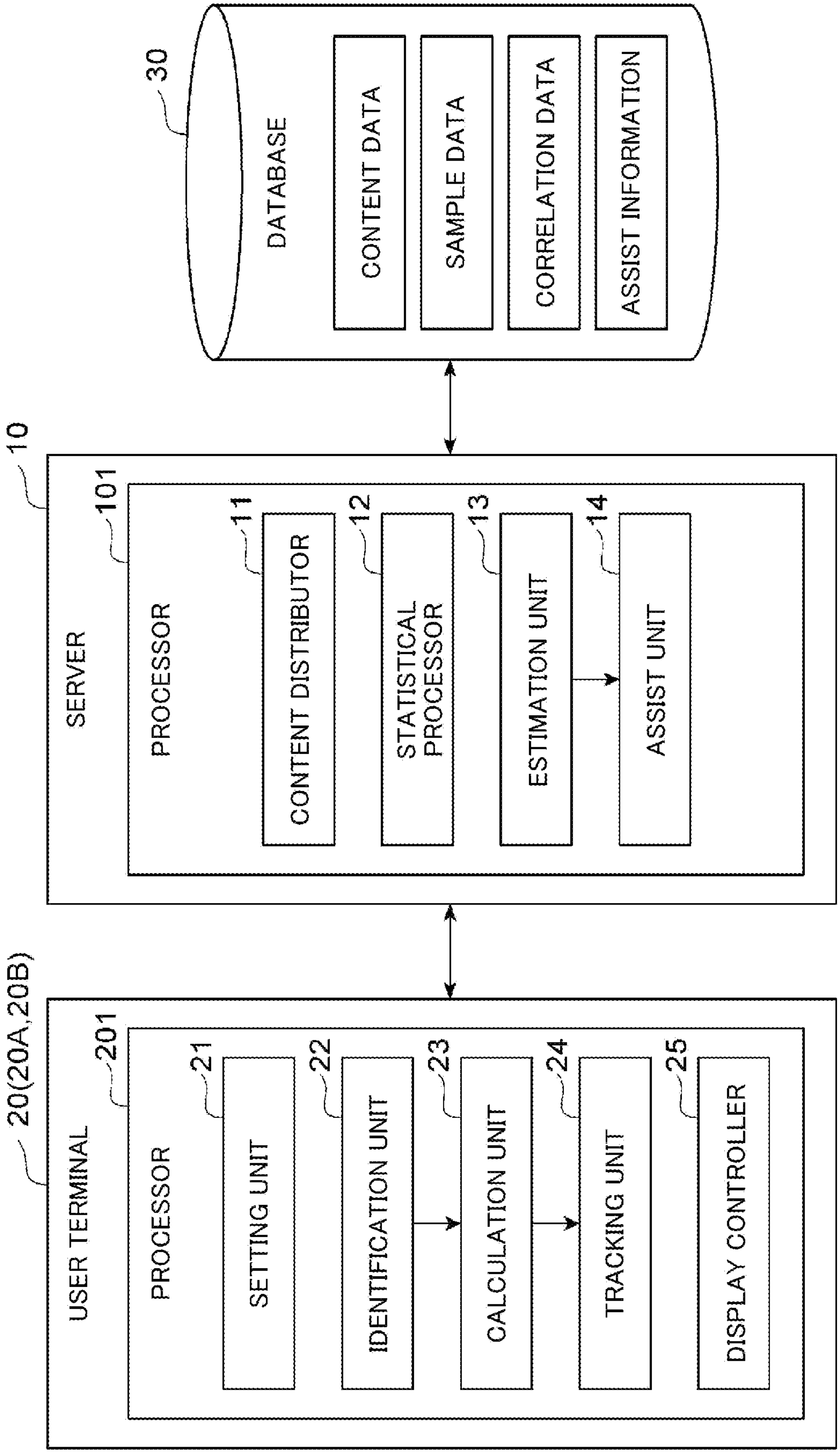
FIG. 3 is a diagram illustrating an exemplary function configuration related to the assist system according to the embodiment.

FIG. 3 is a diagram illustrating an exemplary function configuration related to the assist system 1. The server 10 includes a content distributor 11, a statistical processor 12, an estimation unit 13, and an assist unit 14 as functional elements. The statistical processor 12 is a functional element that generates correlation data. The statistical processor 12 generates correlation data by performing statistical processing on the sample data stored in the database 30, and stores the correlation data in the database 30. The estimation unit 13 is a functional element that estimates the target user understanding level for the target content. The estimation unit 13 acquires target data indicating the target user viewpoint movement from the user terminal 20B, and estimates the target user understanding level based on the target data and the correlation data. The assist unit 14 is a functional element that transmits assist information corresponding to the target user understanding level to the user terminal 20B.

The user terminal 20 includes a setting unit 21, an identification unit 22, a calculation unit 23, a tracking unit 24, and a display controller 25 as functional elements. The setting unit 21 is a functional element that sets a partial area of the first content displayed on the screen of the user terminal 20 as a guidance area. The identification unit 22 is a functional element that identifies the first viewpoint coordinates of the user based on the eye movement of the user gazing at the guidance area. The calculation unit 23 is a functional element that calculates a difference between the area coordinates of the guidance area set by the setting unit 21 and the first viewpoint coordinates identified by the identification unit 22. The tracking unit 24 is a functional element that generates viewpoint data by observing the eye movements of the user viewing the content displayed on the screen of the user terminal 20. The tracking unit 24 calibrates the second viewpoint coordinates of the user viewing the second content by using the calculated difference, and generates viewpoint data indicating the calibrated second viewpoint coordinates. The display controller 25 is a functional element that controls display of a screen on the user terminal 20. In the present embodiment, the eye tracking system includes a setting unit 21, an identification unit 22, a calculation unit 23, a tracking unit 24, and a display controller 25.

[Operation of System]

Figure 4:
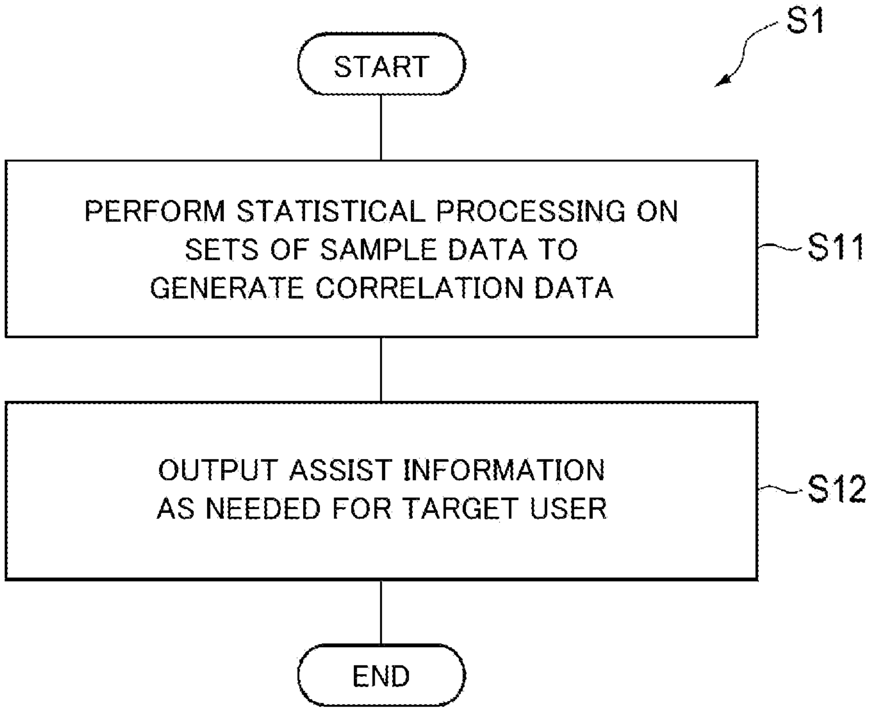
FIG. 4 is a flowchart illustrating an exemplary operation of the assist system in accordance with the embodiment.

FIG. 4 is a flowchart illustrating, as a process flow 51, the operation of the assist system 1. The overview of the process by the assist system 1 will be described with reference to FIG. 4.

In step S11, a statistical processor 12 of a server 10 performs statistical processing on a plurality of sets of sample data to generate correlation data.

The following describes, as an example, how sample data is collected, which is premised in step S11. First, a content distributor 11 distributes sample content to each of a plurality of user terminals 20A. The timing of distributing the sample content to each of the user terminals 20A is not limited. For example, the content distributor 11 may distribute the sample content to each of the user terminals 20A in response to a request from the user terminals 20A, or may simultaneously distribute the sample content to two or more user terminals 20A. In each of the user terminals 20A, the display controller 25 receives and displays the sample content. The tracking unit 24 of each user terminal 20A then generates viewpoint data indicating the viewpoint movement of the sample user having visually recognized that sample content. In one example, the sample user inputs his/her understanding level for the sample content to the user terminal 20A in the form of answering a questionnaire, and the user terminal 20A receives the input. Alternatively, the user terminal 20A or the server 10 may estimate the understanding level of the sample user based on the answer of the user to the sample content (e.g., answer to question). The understanding level to be input or estimated indicates, for example, whether or not the meaning of a word included in a sentence has been understood, whether or not the grammar of the sentence has been understood, or the like. In one example, the user terminal 20A generates sample data representing a pair of viewpoint data generated and the understanding level input or estimated, and transmits the sample data to the server 10. Alternatively, the user terminal 20A may transmit the viewpoint data to the server 10, and the server 10 may generate sample data indicating a pair of the viewpoint data and the understanding level estimated. In any case, the server 10 stores the sample data in the database 30. The server 10 stores, for a specific set of sample content, a plurality of sets of sample data obtained from a plurality of user terminals 20A in a database 30. The server 10 may store a plurality of sets of sample data for each of the plurality of sets of sample contents. The assist system 1 collects sample data through this series of processing.

The statistical processor 12 reads a plurality of sets of sample data from the database and performs statistical processing on the plurality of sets of sample data to generate correlation data. The method of the statistical processing by the statistical processor 12 and how the correlation data generated is expressed is not limited.

In one example, the statistical processor 12 generates correlation data by clustering a plurality of sets of sample data based on the viewpoint movement of the sample user and the user understanding level for the sample content. The statistical processor 12 may determine the similarity in the viewpoint movements based on at least one of the following: the viewpoint movement speed, the number of reversals of the viewpoint (the number of changes in the direction of viewpoint movement), and the area of a region where the viewpoint moved. The statistical processor 12 may determine the similarity of understanding level of content based on at least one of the understanding level of the meaning of each word or the understanding level of the grammar of each sentence. For each set of sample data, the statistical processor 12 may vectorize features related to the viewpoint movement and features related to understanding level as a feature vector, and make the sample data with common or similar feature vectors belong to the same cluster. The statistical processor 12 derives the correlation between the user viewpoint movement and the user understanding level from the clustering results. More specifically, this correlation indicates a pair of a user viewpoint movement tendency and the understanding level corresponding thereto. The statistical processor 12 generates correlation data indicating the correlation and stores the correlation data in the database 30.

In another example, the statistical processor 12 may generate correlation data by performing regression analysis. Specifically, the statistical processor 12 quantifies the viewpoint movement and the understanding level of each sample user based on predetermined rules. The statistical processor 12 then performs regression analysis on the quantified data, and generates a regression equation with the understanding level of the sample user as an objective variable and the viewpoint movement of the sample user as an explanatory variable. In this case, the statistical processor 12 may break down the viewpoint movement of the sample user into a plurality of elements, such as the viewpoint movement speed and the number of viewpoint reversals, and set a plurality of explanatory variables for these elements. For example, the statistical processor 12 may quantify the viewpoint movement speed and the number of viewpoint reversals as independent explanatory variables and perform a multi-regression analysis using the plurality of explanatory variables. The statistical processor 12 stores the regression equation generated through the regression analysis in the database 30 as correlation data. The method of regression analysis performed by the statistical processor 12 may be partial least squares regression (PLS) or support vector regression (SVR). In either case, the correlation data also shows pairs of the user viewpoint movement tendency and the understanding level corresponding thereto.

In yet another example, the statistical processor 12 may generate correlation data by analyzing the correlation between the movement of the sample user viewpoint and the sample user understanding level through machine learning. The machine learning may be deep learning using a neural network. The statistical processor 12 performs supervised learning using sample data as learning data, with a machine learning model configured to output data indicating the user understanding level when data indicating the user viewpoint movement is input to the input layer, and adjusts the weighting parameters within that learning model. The statistical processor 12 stores, as correlation data, the model (learned model) whose weighting parameters have been adjusted in the database 30. In a case of adopting machine learning, the statistical processor 12 may pre-process the sample data stored in the database 30 and convert it into data in a format suitable for machine learning.

The statistical processor 12 may generate various types of correlation data by selecting sample data for statistical processing as appropriate. For example, for each of a plurality of sets of sample content, the statistical processor 12 may generate correlation data using sample data obtained from a plurality of sample users viewing the sets of sample content. In this case, correlation data is generated for each set of content. This correlation data is hereinafter referred to as “content-specific correlation data”. Alternatively, the statistical processor 12 may generate correlation data using sample data from a plurality of sets of sample content (e.g., a plurality of sets of sample content under the same category). In this case, correlation data common to a plurality of sets of content (e.g., a plurality of sets of content under the same category) is generated. This correlation data will be hereinafter referred to as “generalized correlation data”.

In step S12, the assist unit 14 provides assist information to the target user visually recognizing the target content as needed. The assist unit 14 estimates the target user understanding level for the target content, and provides assist information corresponding to the understanding level as needed. The process for outputting assist information is detailed later. The correlation between the user understanding level and the assist information is determined in advance, and the assist information is stored in the database 30 in advance in such a way that the correlation can be specified. The user understanding level may be associated with the assist information so that the assist information can compensate for a part of the target content lacking the target user understanding. For example, for a user understanding level indicating that he/she does not understand the meaning of a word in a sentence in the content, the meaning of the word may be associated as the assist information.

Figure 5:
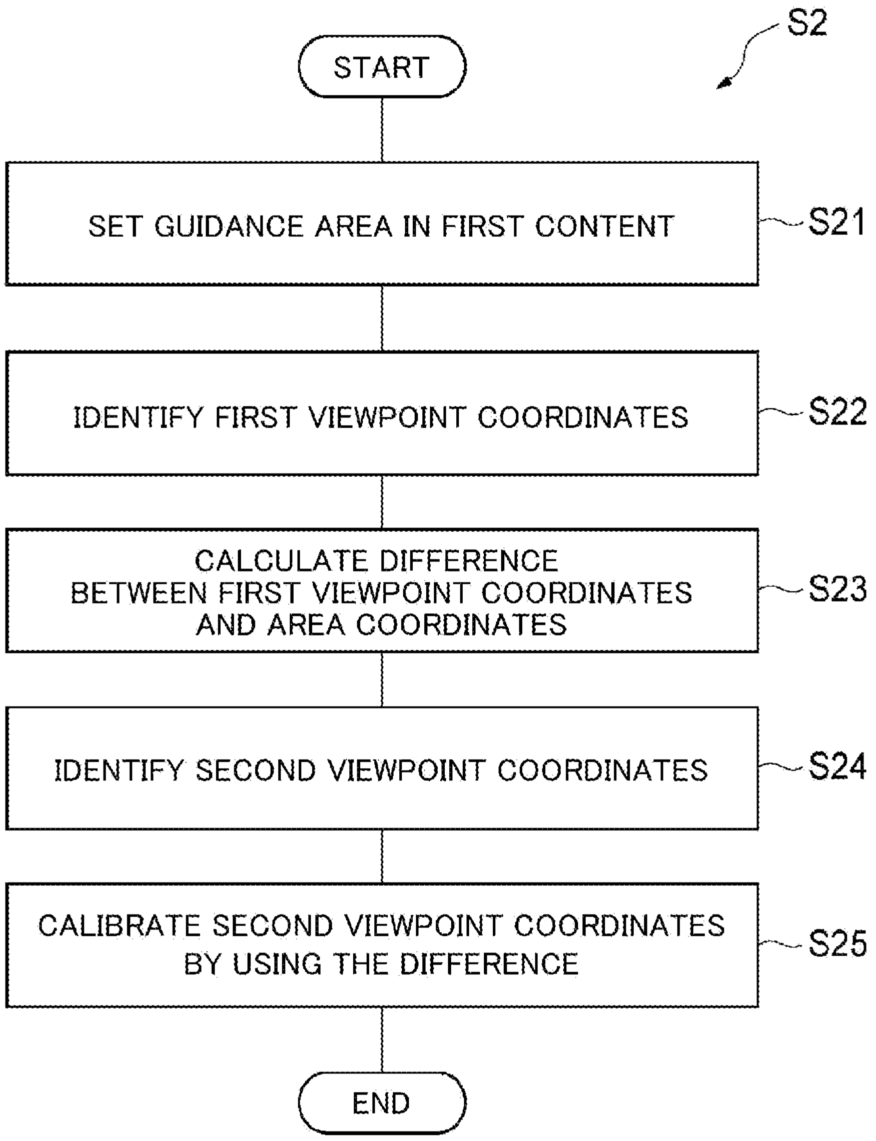
FIG. 5 is a flowchart illustrating an exemplary operation of an eye tracking system according to an embodiment.

FIG. 5 is a flowchart illustrating, as a process flow S2, the operation of the eye tracking system. The processing by the eye tracking system is roughly divided into a process of calculating a difference used for calibrating the viewpoint coordinates (from step S21 to step S23) and a process of calibrating the user viewpoint coordinates by using the calculated difference (from step S24 to step S25).

In step S21, the setting unit 21 dynamically sets, as a guidance area, a partial area of the first content displayed on the screen of the user terminal 20. The first content is any content distributed by the content distributor 11 and displayed by the display controller 25. The first content may be educational content or may be content that is not for educational purposes. The guidance area is an area for causing the user to gaze, and is configured by a plurality of pixels that are continuously arranged. Dynamically setting the guidance area refers to setting a guidance area in the first content in response to display of the first content in which an area for causing the user to gaze is not set in advance, on the screen. In one example, the guidance area is set only while the first content is displayed on the screen. The position of the guidance area in the first content displayed on the screen is not limited. For example, the setting unit 21 may set the guidance area at any given position such as a central part, an upper part, a lower part, or a corner part of the first content. In one example, after the setting unit 21 sets the guidance area, the display controller 25 displays the guidance area in the first content based on that setting. The shape and area (number of pixels) of the guidance area are not limited either. Since the guidance area is the area that the user is prompted to gaze so as to calibrate the viewpoint coordinates, the setting unit 21 typically sets the area of the guidance area to be much smaller than the area of the first content displayed on the screen (i.e., the area of the display device).

The method of dynamically setting the guidance area is not limited. In one example, the setting unit 21 may visually distinguish the guidance area from areas other than the guidance area (hereinafter referred to as the non-guidance areas) by making the display mode of the guidance area different from the non-guidance areas. The method of setting the display mode is not limited. As a specific example, the setting unit 21 may distinguish the guidance areas from the non-guidance areas by decreasing the resolution of non-guidance areas so that the resolution of the guidance area relatively increases without a change in the resolution of the guidance areas. As another specific example, the setting unit 21 may distinguish the guidance area from the non-guidance area by performing a blurring the non-guidance area without changing the display mode of the guidance area. For example, the setting unit 21 may perform the blurring process by setting the color of a target pixel in a non-guidance area to the average color of the plurality of pixels adjacent to that target pixel. The setting unit 21 may perform the blurring process while maintaining the resolution of the non-guidance area, or may perform the blurring process after reducing the resolution. In another specific example, the setting unit 21 may distinguish the guidance area from the non-guidance area by surrounding the outer edge of the guidance area with a specific color or a specific type of frame line. The setting unit 21 may distinguish the guidance area from the other areas by combining any two or more out of resolution adjustment, blurring process, and border drawing.

Alternatively, in a case where the first content includes a selectable object that can be selected by the user, the setting unit 21 may set the area having the selectable object as the guidance area. In other words, the setting unit 21 may identify that selectable object as a partial area and set that selectable object as the guidance area. Typically, the selectable object may be a selection button or link displayed on a tutorial screen of an application program. Alternatively, in a case where the user terminal 20 performs an exercise or a test, the selectable object may be a button for selecting a question or a button for starting the exercise or the test. The setting unit 21 may decrease the resolution of the non-guidance area while maintaining the resolution of the selectable object set as the guidance area. In addition to or instead of this process, the setting unit 21 may perform a blurring process on the non-guidance area, or may surround the outer edge of the selectable object set as the guidance area with a specific color or a specific type of frame line.

The setting unit 21 sets the area coordinates of the guidance area using any given method. For example, the setting unit 21 may set the coordinates of the center of the guidance area or the center of gravity of the guidance area as the area coordinates. Alternatively, the setting unit 21 may set the position of any one of the pixels in the guidance area as the area coordinates.

In step S22, the identification unit 22 identifies the viewpoint coordinates of the user gazing at the guidance area as first viewpoint coordinates. The identification unit 22 identifies the viewpoint coordinates based on the user's eye movement. The method of identifying the viewpoint coordinates is not limited. In one example, the identification unit 22 may take a peripheral image of the user's eye by the imaging unit 207 of the user terminal 20 and identifies the viewpoint coordinates based on the position of the iris with the user's inner canthus as the reference point. In another example, the identification unit 22 may identify the viewpoint coordinates of the user by using a pupil center corneal reflection method (PCCR). In a case where the corneal reflection method is adopted, the user terminal 20 may include an infrared emitting device and an infrared camera as a hardware configuration.

In step S23, the calculation unit 23 calculates a difference between the first viewpoint coordinates identified by the identification unit 22 and the area coordinates of the guidance area set by the setting unit 21. For example, in a case where the position on the screen of user terminal 20 is expressed in an XY coordinate system, where the first viewpoint coordinates are (105, 105), and where the area coordinates are (100, 100), the difference is (105-100, 105-100)=(5, 5). The calculation unit 23 stores the calculated difference in any storage device, such as the main storage 202, or the auxiliary storage 203.

To improve the accuracy of calibration, the user terminal 20 may repeat the process from step S21 to step S23 multiple times while changing the position of the guidance area. In this case, the calculation unit 23 may set a statistical value (e.g., a mean value) of the plurality of differences calculated, as the difference to be used in the subsequent calibration process (step S25).

In step S24, the tracking unit 24 identifies the viewpoint coordinates of the user who looks at the second content as second viewpoint coordinates. The second content is any content distributed by the content distributor 11 and displayed by the display controller 25. For example, the second content may be sample content or target content. The tracking unit 24 may identify the second viewpoint coordinates in a manner similar to identifying the first viewpoint coordinates by the identification unit 22 (i.e., through a method similar to step S22). The second content may be different from or the same as the first content.

In step S25, the tracking unit 24 calibrates the second viewpoint coordinates by using the difference. For example, in a case where the second viewpoint coordinates identified in step S24 are (190, 155) and the difference calculated in step S23 is (5, 5), the tracking unit 24 calibrates the second viewpoint coordinates as (190-5, 155-5)=(185, 150).

The tracking unit 24 may repeat the processing of steps S24 and S25, acquire calibrated coordinates of a plurality of second viewpoints arranged in a time sequence, and generate viewpoint data indicating the movement of the user viewpoint. Alternatively, the tracking unit 24 may acquire calibrated coordinates of a plurality of second viewpoints, and the server 10 may generate viewpoint data based on the coordinates of the plurality of second viewpoints.

An exemplary setting of a guidance area is described below with reference to FIG. 6 and FIG. 7. Each of FIG. 6 and FIG. 7 is a diagram illustrating an exemplary guidance area set in the first content by the setting unit 21.

Figure 6:
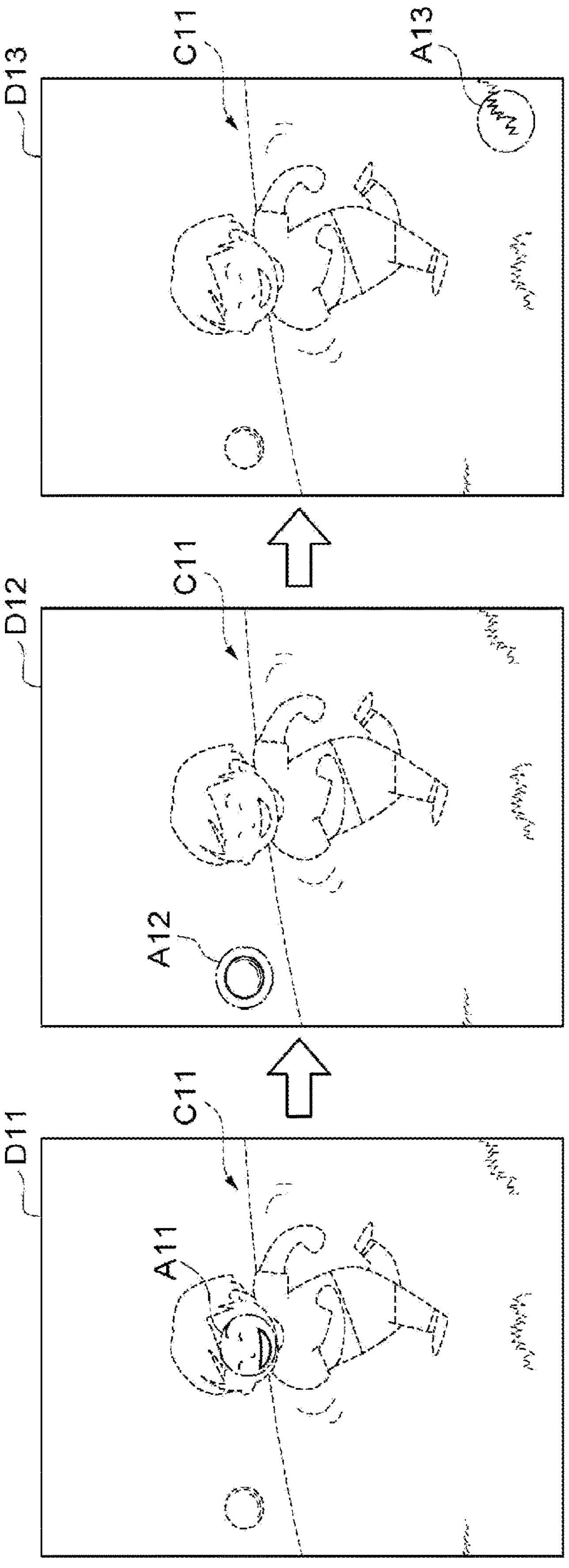
FIG. 6 is a diagram illustrating an exemplary guidance area set in a first content.
Figure 7:
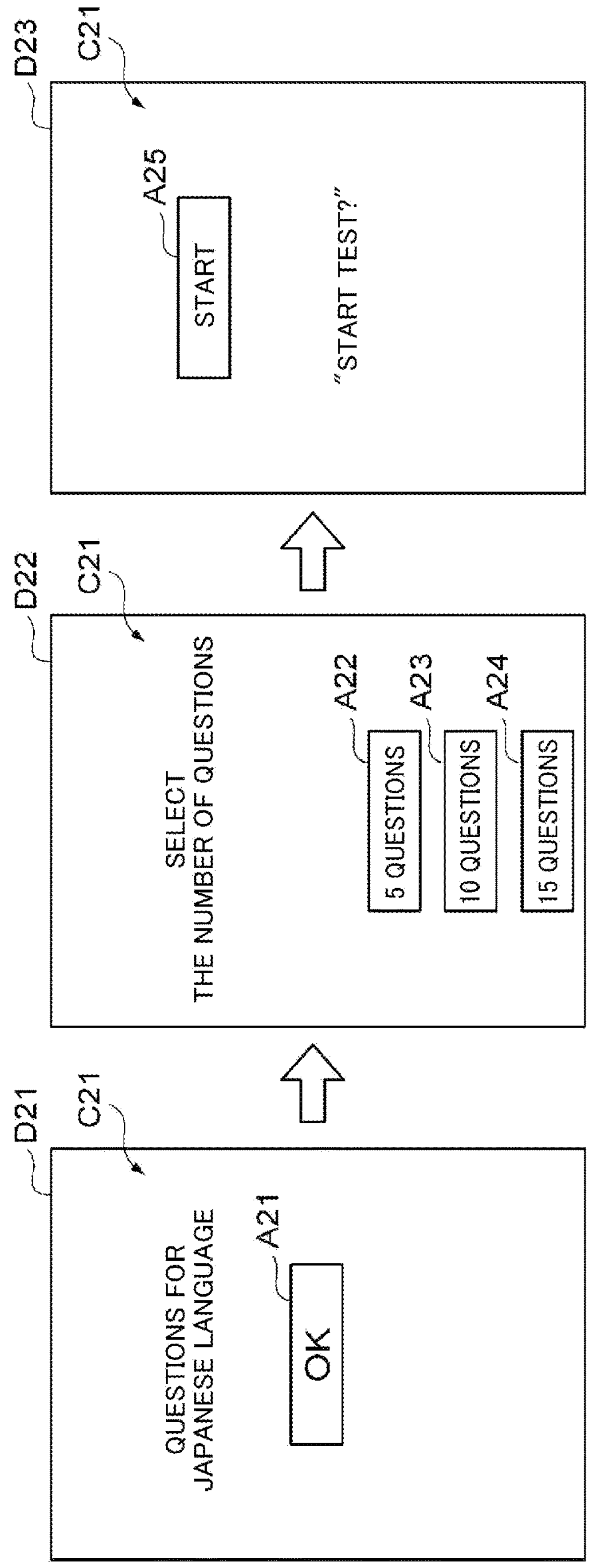
FIG. 7 is a diagram illustrating another exemplary guidance area set in a first content.

In the example of FIG. 6, the setting unit 21 sets the guidance area by reducing the resolution of the non-guidance area. In this example, the user terminal 20 displays first content C11 including a child, lawn, and a ball, and calculates a difference while changing the position of the guidance area on the first content C11. As the position of the guidance area changes, the display changes in an order of screens D11, D12, and D13. In FIG. 6, the non-guidance area is represented by a dashed line.

First, the setting unit 21 sets a part of the child's face as the guidance area A11. The screen D11 corresponds to this setting. The setting unit 21 lowers the resolutions of the areas (non-guidance areas) other than the guidance area A11 without changing the resolution of the guidance area A11. In one example, the setting unit 21 may reduce the resolution of the non-guidance area so that the resolution of the guidance area A11 is more than a double or a quadruple of the resolution of the non-guidance area. For example, where the resolution of the guidance area A11 is 300 ppi, the resolution of the non-guidance area may be 150 ppi or less or 75 ppi or less. With such a resolution setting, the non-guidance area appears blur as compared to the guidance area A11, so that the user's line of sight is usually directed to the clearly displayed guidance area A11. Therefore, it is possible to identify the viewpoint coordinates (first viewpoint coordinates) of the user gazing at the guidance area A11. While the screen D11 is displayed, the identification unit 22 acquires the first viewpoint coordinates of the user. The calculation unit 23 then calculates the difference between that first viewpoint coordinates and the area coordinates of the guidance area A11.

The setting unit 21 then sets a part of the ball as the guidance area A12. The screen D12 corresponds to this setting. The setting unit 21 restores the resolution of the guidance area A12 to the original value, and lowers the resolutions of the areas (non-guidance areas) other than the guidance area A12. As a result, the line of sight of the user is usually directed to the guidance area A12. While the screen D12 is displayed, the identification unit 22 acquires the first viewpoint coordinates of the user. The calculation unit 23 then calculates the difference between first viewpoint coordinates and the area coordinates of the guidance area A12.

The setting unit 21 then sets the lower right part of the first content C11 (the lawn area) as the guidance area A13. The screen D13 corresponds to this setting. The setting unit 21 restores the resolution of the guidance area A13 to the original value, and lowers the resolutions of the areas (non-guidance areas) other than the guidance area A13. As a result, the line of sight of the user is usually directed to the guidance area A13. While the screen D13 is displayed, the identification unit 22 acquires the first viewpoint coordinates of the user. The calculation unit 23 then calculates the difference between that first viewpoint coordinates and the area coordinates of the guidance area A13. The calculation unit 23 obtains a statistical value of a plurality of differences calculated. This statistical value is used for calibration (step S25) of the second viewpoint coordinates by the tracking unit 24.

In the example of FIG. 7, the setting unit 21 sets the selectable object in the first content C21 as the guidance area. In this example, the first content C21 is a tutorial for an online academic test. With a progress in the tutorial, the display changes in an order of the screens D11, D12, and D13.

Screen D21 includes a text string "Questions for Japanese language." and an OK button. The OK button is a selectable object. The setting unit 21 sets the area with the OK button as a guidance area A21. Normally, the user gazes at the selectable object while operating the selectable object. Therefore, the viewpoint coordinates (first viewpoint coordinates) of the user gazing at the guidance area A21 can be identified. In one example, when the OK button is selected by the user, the identification unit 22 acquires the first viewpoint coordinates of the user. The calculation unit 23 then calculates the difference between that first viewpoint coordinates and the area coordinates of the guidance area A21.

When the user operates the OK button, the display controller 25 switches the screen D21 to the screen D22. Screen D22 includes the text string "Please select the number of questions." and three selection buttons: "5 questions", "10 questions" and "15 questions". These selection buttons are selectable objects. The setting unit 21 sets the areas with the three selection buttons as a guidance area A22, a guidance area A23, and a guidance area A24, respectively. In one example, when the user selects any one of the three selection buttons, the identification unit 22 identifies the viewpoint coordinates (first viewpoint coordinates) of the user. The calculation unit 23 then calculates the difference between the first viewpoint coordinates and the area coordinates of the guidance area corresponding to the selectable object selected by the user (any one of the guidance areas A22 to A24).

When the user selects a selection button, the display controller 25 switches the screen D22 to the screen D23. Screen D23 includes the text string "Start test?" and a start button. The start button is a selectable object. The setting unit 21 sets the area with the start button as a guidance area A25. In one example, when the start button is selected by the user, the identification unit 22 acquires the first viewpoint coordinates of the user. The calculation unit 23 then calculates the difference between the first viewpoint coordinates and the area coordinates of the guidance area A25. The calculation unit 23 obtains a statistical value of a plurality of differences calculated. This statistical value is used for calibration (step S25) of the second viewpoint coordinates by the tracking unit 24.

Figure 8:
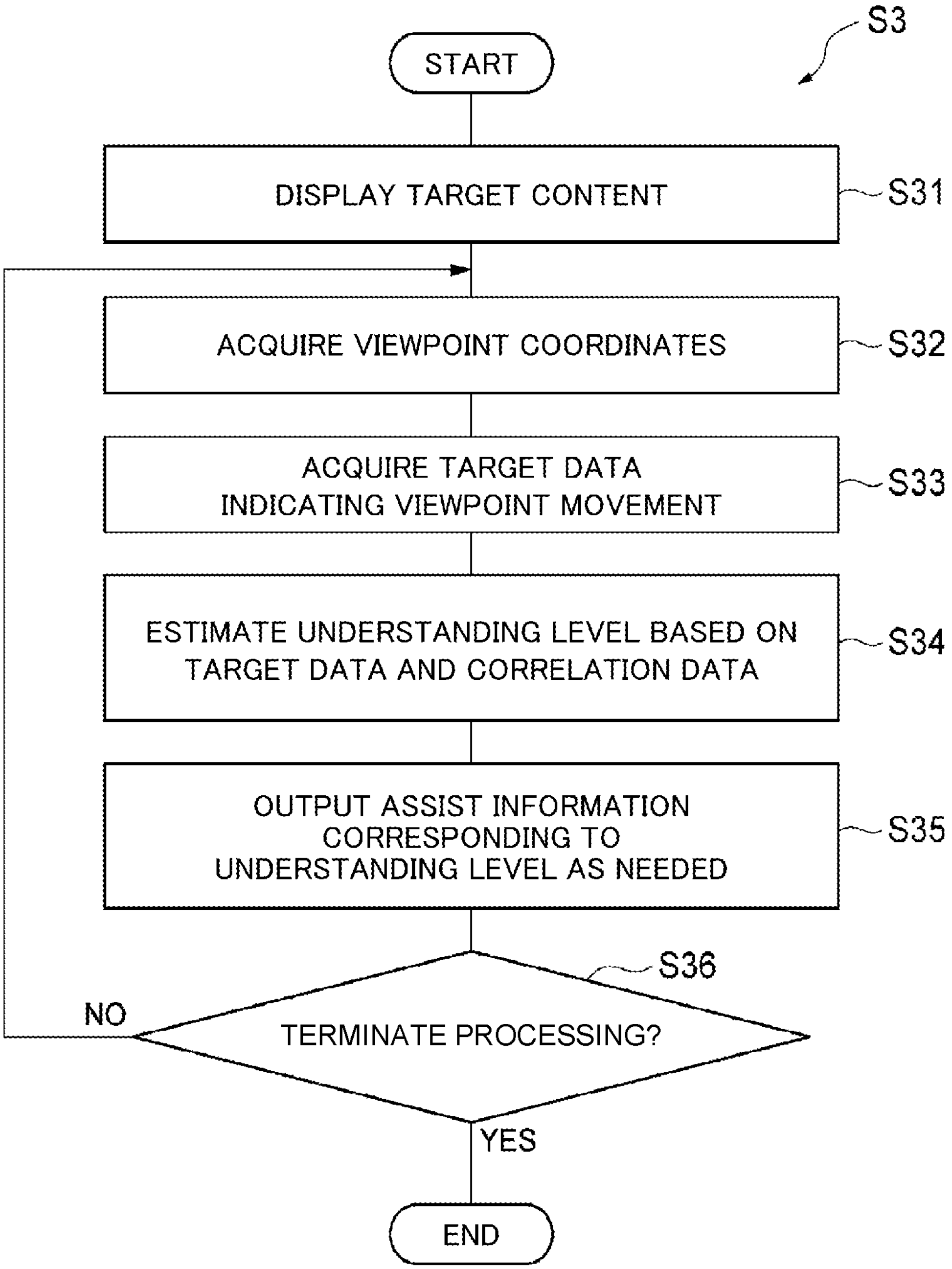
FIG. 8 is a flowchart illustrating an exemplary operation of the assist system in accordance with the embodiment.

FIG. 8 is a flowchart illustrating, as a process flow S3, an example of the operation of the assist system 1. The process flow S3 indicates a processing procedure for providing assist information to the target user who views the target content. The process flow S3 is based on the premise that the target user has logged into the assist system 1. It is also assumed that the eye tracking system has already calculated the differences that are used for calibrating the viewpoint coordinates.

In step S31, the display controller 25 of the user terminal 20B displays the target content on the screen of the user terminal 20B. For example, the display controller 25 receives, from the server 10, content data distributed from the content distributor 11, and displays the target content based on the content data.

In step S32, the tracking unit 24 of the user terminal 20B acquires the viewpoint coordinates (second viewpoint coordinates) of the target user who visually recognizes the target content. Specifically, the tracking unit 24 identifies the viewpoint coordinates (viewpoint coordinates before calibration) based on the eye movements of the target user looking at the target content, and calibrates the viewpoint coordinates identified, by using the difference calculated in advance. The tracking unit 24 may acquire the calibrated viewpoint coordinates at each given time interval and generate viewpoint data (i.e., target data indicating the movement of the target user viewpoint) in which coordinates of a plurality of viewpoints are arranged in a time sequence.

In step S33, the estimation unit 13 acquires the target data. For example, the estimation unit 13 may receive the target data from the tracking unit 24 of the user terminal 20B. Alternatively, the tracking unit 24 may sequentially transmit calibrated coordinates of a plurality of viewpoints to the server 10, and the estimation unit 13 may generate viewpoint data (target data) in which coordinates of a plurality of viewpoints are arranged in a time sequence.

In step S34, the estimation unit 13 refers to the database 30 to obtain correlation data, and estimates the target user understanding level for the target content based on the target data and correlation data. In one example, in a case where the correlation data is generated by clustering, the estimation unit 13 estimates the understanding level indicated by the cluster to which the target data belongs as the target user understanding level. In another example, in a case where the correlation data is generated by regression analysis, the estimation unit 13 applies the target data to the regression equation to estimate the target user understanding level. In yet another example, in a case where the correlation data is a learned model, the estimation unit 13 estimates the target user understanding level by inputting the target data into that learned model.

In step S35, the assist unit 14 acquires assist information corresponding to the target user understanding level from the database 30, and transmits the assist information to the user terminals 20B. The display controller 25 of the user terminal 20B displays the assist information on the screen of the user terminal 20B. The output timing of the assist information is not limited. For example, the display controller 25 may output the assist information after a predetermined time (e.g., 15 seconds) has elapsed from the point of displaying the target content on the screen of the user terminal 20. Alternatively, the display controller 25 may output the assist information in response to a request from the user. The display controller 25 may adjust the display time of the assist information according to the user understanding level. Alternatively, the display controller 25 may display the assist information only during a display time set in advance by the user or others. Alternatively, the assist unit 14 may display the assist information until the display of the target content is switched, or until user input is made for the target content (e.g., answers to questions). If the estimated understanding level indicates that the target user understanding level for the target content is sufficient, the assist unit 14 may terminate the process without outputting any assist information. An output mode of the assist information is not limited. When the assist information includes voice data, the user terminal 20 may output the voice data from a speaker.

As shown as step S36, the assist system 1 repeats the process from step S32 to step S35 while the user terminal 20B is displaying the target content. In one example, the assist system 1 repeats the series of processes while the target content is displayed.

Figure 9:
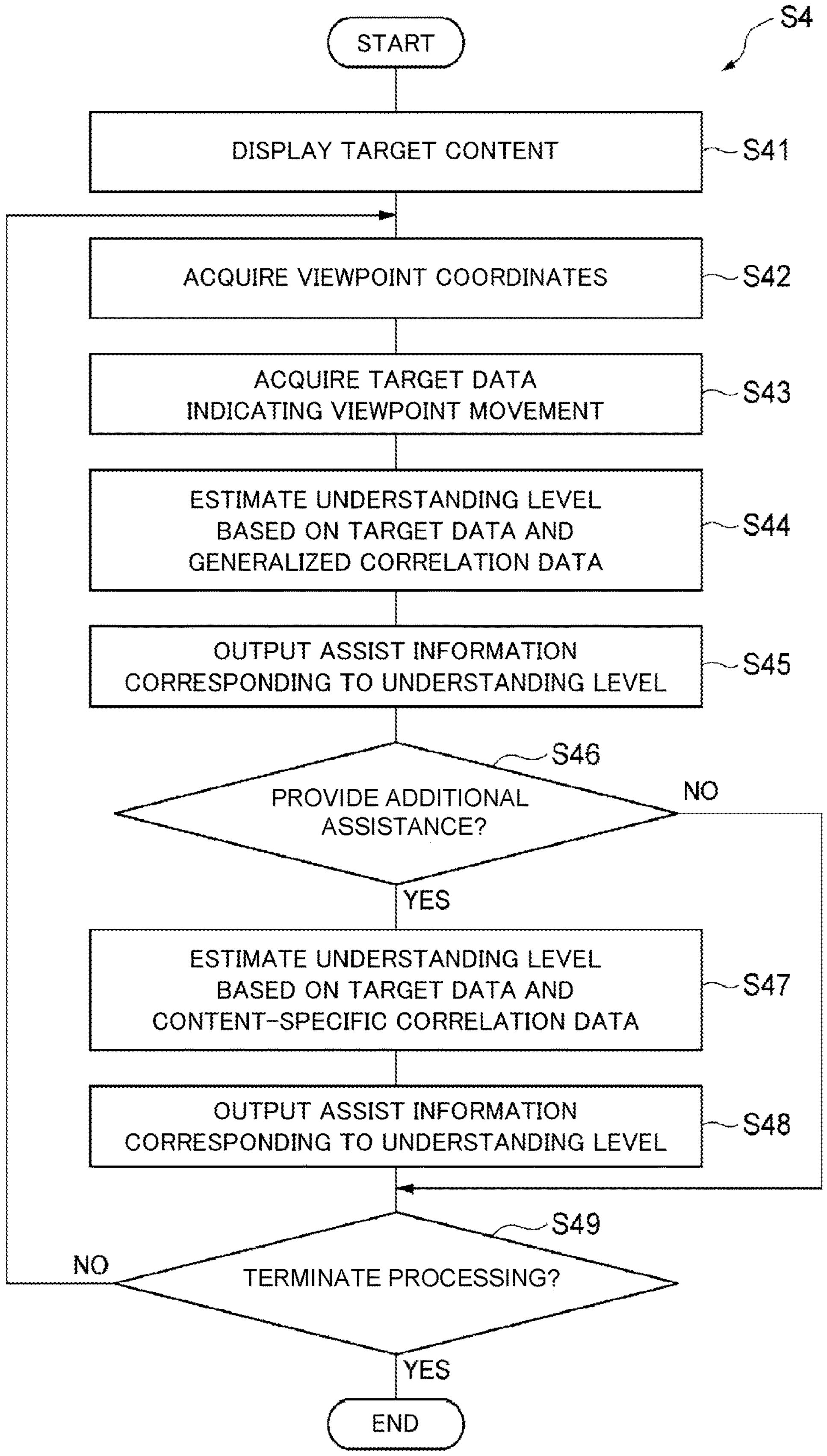
FIG. 9 is a flowchart illustrating an exemplary operation of the assist system in accordance with the embodiment.

FIG. 9 is a flowchart illustrating as a process flow S4 an exemplary operation of the assist system 1. The process flow S4 also relates to a process of providing the assist information to the target user who views the target content, but different from that of the process flow S3 in the specific steps thereof. The process flow S4 also assumes that the target user is logged into the assist system 1 and that the eye tracking system has already calculated the difference.

In step S41, the display controller 25 of the user terminal 20B displays the target content on the screen of the user terminal 20B. In step S42, the tracking unit 24 of the user terminal 20B acquires the viewpoint coordinates (second viewpoint coordinates) of the target user who visually recognizes the target content. In step S43, the estimation unit 13 acquires target data indicating the target user viewpoint movement. This series of processes is similar to steps S31 to S33.

In step S44, the estimation unit 13 refers to the database 30 to obtain generalized correlation data, and estimates the target user understanding level (first understanding level) for the target content based on the target data and generalized correlation data. A specific estimation method is similar to the method in step S34.

In step S45, the assist unit 14 acquires assist information corresponding to the target user's first understanding level from the database 30, and transmits the assist information to the user terminal 20B. The display controller 25 of the user terminal 20B outputs assist information to the screen of the user terminal 20B.

In step S46, the assist unit 14 determines whether to provide additional assistance to the target user, that is, whether to provide additional assist information to the target user. When the assist unit 14 determines not to perform additional assistance, the process proceeds to step S49. When the assist unit 14 determines to perform additional assistance, the process proceeds to step S47. In one example, the assist unit 14 may determine that no additional assistance is provided if there is a user input to the target content (e.g., an answer to a question) within a predetermined time period, and if there is no user input within the predetermined time period, the assist unit 14 may determine that additional assistance is provided.

In step S47, the estimation unit 13 refers to the database 30 to obtain correlation data specific to the target content, and estimates the target user understanding level for the target content (second understanding level) based on the target data and content-specific correlation data. This process assumes that the same content is used as sample content and target content. A specific estimation method is similar to the method in step S34.

In step S48, the assist unit 14 acquires additional assist information corresponding to the target user's second understanding level from the database 30, and transmits the assist information to the user terminal 20B. The display controller 25 of the user terminal 20B outputs additional assist information to the screen of the user terminal 20B.

As shown as step S49, the assist system 1 repeats the process from step S42 to step S48 while the user terminal 20B is displaying the target content. In one example, the assist system 1 repeats the series of processes while the target content is displayed.

Figure 10:
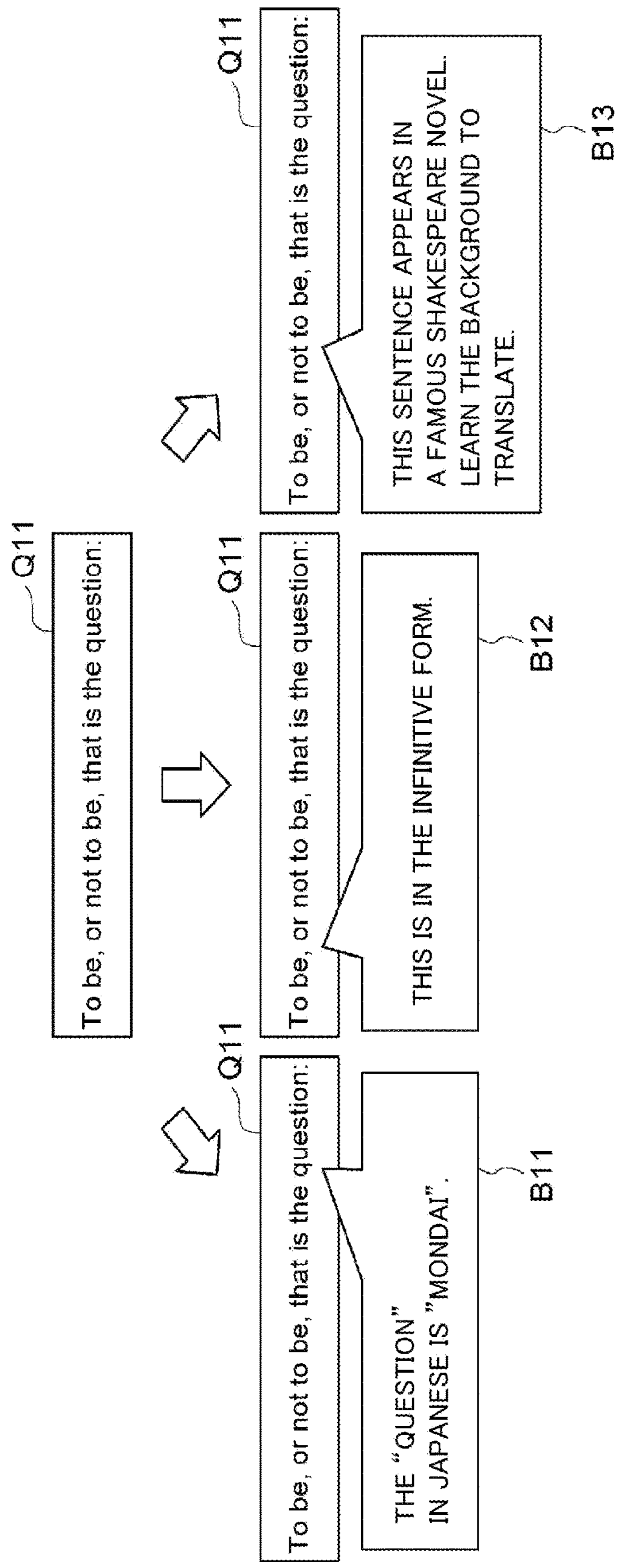
FIG. 10 is a diagram illustrating exemplary assist information.

FIG. 10 is a diagram illustrating exemplary assist information. This example assumes that the target content Q11 is a part of an English question and the target users are Japanese students. In this example, the assist system 1 refers to correlation data that includes information about an understanding level Ra indicating "lack of vocabulary", an understanding level Rb indicating "lack of grammatical competence" and an understanding level Rc indicating "lack of understanding about the background of the sentence". For example, when the estimation unit 13 estimates that the vocabulary of the target user is insufficient based on the target data and the correlation data, the assist unit 14 outputs assist information B11 corresponding to the user's understanding level. If the estimation unit 13 estimates that the target user's grammatical ability is insufficient, the assist unit 14 outputs assist information B12 corresponding to the user's understanding level. If the estimation unit 13 estimates that the target user does not understand the background of the sentence, the assist unit 14 outputs assist information B13 corresponding to the user's understanding level. The display controller 25 of the user terminal 20B displays the assist information output. The target user can refer to the assist information to solve the problem.

[Advantages]

As described above, an assist system according to an aspect of the present disclosure includes at least one processor. The at least one processor: obtains target data indicating the target user viewpoint movement on the screen displaying the target content; refers to a storage unit storing correlation data indicating a correlation between a user viewpoint movement and a user understanding level for content and assist information corresponding to the user understanding level for the content, wherein the correlation data is obtained through statistical processing of a plurality of sets of sample data obtained from a plurality of sample users having visually recognized sample content, each of the plurality of sets of sample data indicating a pair of: a viewpoint movement of a sample user among the plurality of the sample users having visually recognized the sample content; and an understanding level of the sample user for the sample content; estimates a target user understanding level for the target content based on the target data and the correlation data; and outputs the assist information corresponding to the estimated understanding level of the target user.

An assist method according to an aspect of the present disclosure is executed by an assist system including at least one processor. The method includes: obtaining target data indicating a target user viewpoint movement on a screen displaying target content; referring to a storage unit storing correlation data indicating a correlation between a user viewpoint movement and a user understanding level for content and assist information corresponding to the user understanding level for the content, wherein the correlation data is obtained through statistical processing of a plurality of sets of sample data obtained from a plurality of sample users having visually recognized sample content, each of the plurality of sets of sample data indicating a pair of: a viewpoint movement of a sample user among the plurality of the sample users having visually recognized the sample content; and an understanding level of the sample user for the sample content; estimating a target user understanding level for the target content based on the target data and the correlation data; and outputting the assist information corresponding to the estimated understanding level of the target user.

The assist program according to an aspect of the present disclosure causes a computer to execute: obtaining target data indicating a target user viewpoint movement on a screen displaying target content; referring to a storage unit storing correlation data indicating a correlation between a user viewpoint movement and a user understanding level for content and assist information corresponding to the user understanding level for the content, wherein the correlation data is obtained through statistical processing of a plurality of sets of sample data obtained from a plurality of sample users having visually recognized sample content, each of the plurality of sets of sample data indicating a pair of: a viewpoint movement of a sample user among the plurality of the sample users having visually recognized the sample content; and an understanding level of the sample user for the sample content; estimating a target user understanding level for the target content based on the target data and the correlation data; and outputting the assist information corresponding to the estimated understanding level of the target user.

In such an aspect, the correlation data is generated through statistical processing of the sample data obtained from the sample user, and the target user understanding level is estimated based on the correlation data and the target data indicating the target user viewpoint movement with respect to the target content. By using the correlation data obtained through the statistical processing, the target user understanding level is estimated based on the actual tendency of the user who visually recognizes content. Outputting assist information based on this estimation allows appropriate assistance of the target user who visually recognizes the target content. Since the correlation between the user viewpoint movement and the user understanding level is derived through statistical processing, there is no need to set up a hypothesis in advance regarding the correlation. In addition, statistical processing makes it possible to determine the correlation with a high degree of accuracy (it is very difficult to set up a hypothesis with a high degree of accuracy). Thus, the target user can be assisted appropriately according to the actual situation.

In the assist system related to another aspect, the statistical processing includes clustering the plurality of sets of sample data based on the movement of the sample user viewpoint and the sample user understanding level. In this case, the correlation between the user viewpoint movement and the user understanding level can be appropriately derived through clustering.

In the assist system related to another aspect, the statistical processing may include performing regression analysis on the plurality of sets of sample data. In this case, the correlation between the user viewpoint movement and the user understanding level can be appropriately derived through regression analysis.

In the assist system related to another aspect, the at least one processor may output the assist information after a predetermined time elapses from a point of displaying the target content on the screen. In this case, it is possible to give the target user time to think about the target content without using the assist information and the degree of freedom of learning using the target content by the target user can be enhanced, for example.

In the assist system related to another aspect, the correlation data may include: generalized correlation data obtained by performing the statistical processing on a plurality of sets of first sample data including the sample data obtained from the sample users having visually recognized the sample content different from the target content; and content-specific correlation data obtained by performing the statistical processing on a plurality of sets of second sample data obtained from a plurality of sample users having visually recognized the target content as sample content. The at least one processor may be configured to: estimate a target user understanding level for the target content based on the target data and the generalized correlation data, output the assist information corresponding to the estimated first understanding level of the target user, estimate a second understanding level of the target user for the target content based on the target data and the content-specific correlation data, and output the assist information corresponding to the estimated second understanding level of the target user. In this case, users can be effectively assisted by two types of assist information: assist information based on generalized correlation data (general assist information not limited to the target content) and assist information based on content-specific correlation data (assist information specialized for the target content).

In the assist system related to another aspect, the at least one processor may output the assist information corresponding to the second understanding level of the target user after outputting the assist information corresponding to the first understanding level of the target user. In this case, the user can be effectively assisted by assistance information based on content-specific correlation data (i.e., more specific assist information) for target users whose understanding of the target content is insufficient with only assist information based on generalized correspondence relation data.

[Variation]

The present disclosure has been described above in detail based on the embodiment. However, the present disclosure is not limited to the embodiment described above. The present disclosure may be changed in various ways without departing from the spirit and scope thereof.

In the above embodiments, the assist system 1 is configured by using the server 10; however, the assist system 1 may be configured without the server 10. In this case, each functional element of the server 10 may be implemented in any one of the user terminals 20, and for example, may be implemented in any one of a terminal used by a distributor of content and a terminal used by a viewer of content. Alternatively, each one of the functional elements of the server 10 may be implemented separately in a plurality of user terminals 20, e.g., separate terminals of the distributor and of the viewer. In this regard, the assist program may be implemented as a client program. Since the user terminal 20 has the function of the server 10, it is possible to reduce the load on the server 10. In addition, information about the viewer of the content, such as students (e.g., data indicating viewpoint movement), is not transmitted outside of the user terminal 20, making it possible to more reliably protect the viewer's confidentiality.

In the above embodiments, the eye tracking system is configured only with the user terminal 20; however, the system may be configured by using the server 10. In this case, some functional elements of the user terminal 20 may be implemented in the server 10. For example, a functional element corresponding to the calculation unit 23 may be implemented in the server 10.

In the above embodiments, the assist information is displayed separately from the target content; however, the assist information may be displayed in such a manner as to constitute a part of the target content. For example, if the target content includes text, the assist unit 14 may highlight parts of the sentence (e.g., parts that are important for understanding the text) as assist information. In other words, the assist information may be a visual effect added to the target content. In this case, the assist unit 14 may perform the highlighting by making the color or font of a part of the sentence subject to the assist information different from other parts.

In the above embodiments, the assist system 1 outputs the assist information corresponding to the target user understanding level. However, the assist system 1 may output the assist information without using the understanding level. This variation is described below.

The server 10 obtains viewpoint data indicating the movement of the viewpoint of the sample user who visually recognized the sample contents and sample data indicating assist information presented to the sample user from respective user terminals 20A, and stores the sample data in a database 30. In one example, the assist information presented to the sample user (i.e., the assist information corresponding to the sample user) is identified through manual experimentation or investigation, questionnaires to the sample user, and the like, and is input to user terminal 20A. The statistical processor 12 performs statistical processing on the sample data in the database 30, generates correlation data indicating the correlation between the user viewpoint movement and the content assist information, and stores the correlation data in the database 30. As in the above embodiments, the statistical processing methods and the form of expression of the generated correlation data are not limited. Therefore, statistical processor 12 may generate correlation data through various methods such as clustering, regression analysis, machine learning, etc.

Server 10 outputs the assist information corresponding to the target data received from user terminal 20B based on the target data and its correlation data. In one example, the estimation unit 13 refers to the database 30 to obtain the correlation data and identify the assist information corresponding to the target data. In a case where correlation data is generated by clustering, the estimation unit 13 identifies the assist information indicated by the cluster to which the target data belongs. In another example, if the correlation data is generated by regression analysis, the estimation unit 13 applies the target data to the regression equation to identify the assist information. In yet another example where the correlation data is a learned model, the estimation unit 13 identifies the assist information by inputting the target data into that learned model. The assist unit 14 obtains the assist information identified from database 30 and transmits the assist information to user terminal 20B.

That is, an assist system according to an aspect of the present disclosure includes at least one processor. The at least one processor: obtains target data indicating the target user viewpoint movement on the screen displaying the target content; refers to a storage unit storing correlation data indicating a correlation between a user viewpoint movement and assist information for content, wherein the correlation data is obtained through statistical processing of a plurality of sets of sample data obtained from a plurality of sample users having visually recognized sample content, each of the plurality of sets of sample data indicating: a viewpoint movement of a sample user among the plurality of the sample users having visually recognized the sample content; and the assist information corresponding to the sample user; and outputs the assist information corresponding to the target data based on the target data and the correlation data.

In this aspect, the sample data obtained from the sample user is subjected to statistical processing to generate correlation data, and the assist information is output based on the correlation data and the target data indicating the target user viewpoint movement for the target content. By using correlation data obtained through the statistical processing, assist information can be output in line with the actual tendencies of users visually recognizing the contents. Therefore, it is possible to appropriately assist the target user who visually recognizes the target content.

In the present disclosure, the expression "at least one processor executes a first process, a second process, and . . . executes an n-th process." or the expression corresponding thereto is a concept including the case where the execution bodies (i.e., processors) of the n processes from the first process to the n-th process change in the middle. In other words, this expression is a concept including both a case where all of the n processes are executed by the same processor and a case where the processor changes during the n processes, according to any given policy.

The processing procedure of the method executed by the at least one processor is not limited to the example of the above embodiments. For example, a part of the above-described steps (processing) may be omitted, or each step may be executed in another order. Any two or more of the above-described steps may be combined, or some of the steps may be modified or deleted. Alternatively, other steps may be executed in addition to the steps described above.

DESCRIPTION OF REFERENCE CHARACTERS

1 Assist System
10 Server
11 Content Distributor
12 Statistical Processor
13 Estimation Unit
14 Assist Unit
20, 20A, 20B User Terminal
21 Setting Unit
22 Identification Unit
23 Calculation Unit
24 Tracking Unit
25 Display Controller
30 Database
100 Server Computer
101 Processor
102 Main Storage
103 Auxiliary Storage
104 Communication Unit
200 Terminal Computer
201 Processor
202 Main Storage
203 Auxiliary Storage

204 Communication Unit
205 Input Interface
206 Output Interface
207 Imaging Unit
A11, A12, A13, A21, A22, A23, A24, A25 Guidance Area
C11, C21 First Content
D11, D12, D13, D21, D22, D23 Screen
N Communication Network
P1 Server Program
P2 Client Program

The invention claimed is:

1. An assist system, comprising at least one processor configured to:

display, on a screen, target content to be visually recognized by a target user;

obtain, by an eye tracking system including a camera, coordinates of a target user's viewpoint on the screen displaying the target content at each given time interval based on target user's eye movement captured by the camera;

generate target data indicating a viewpoint movement of the target user on the screen displaying the target content, wherein the target data indicates coordinates of a plurality of viewpoints arranged in a time sequence;

refer to a storage unit storing correlation data and assist information, the correlation data indicating a correlation between a user viewpoint movement and a user understanding level for content, the assist information corresponding to the user understanding level for the content, wherein the correlation data is obtained through statistical processing of a plurality of sets of sample data, the plurality of sets of sample data are obtained from a plurality of sample users having visually recognized sample content, and each of the plurality of sets of sample data indicates a pair of:

a viewpoint movement of a sample user among the plurality of the sample users having visually recognized the sample content; and an understanding level of the sample user for the sample content;

estimate a target user understanding level for the target content based on the target data and the correlation data; and output, to the screen, the assist information corresponding to the target user understanding level estimated, wherein the correlation data includes:

generalized correlation data obtained by performing the statistical processing on a plurality of sets of first sample data including the sample data obtained from the sample users having visually recognized the sample content different from the target content; and content-specific correlation data obtained by performing the statistical processing on a plurality of sets of second sample data obtained from a plurality of sample users having visually recognized the target content as sample content, and the at least one processor is configured to:

estimate a first understanding level of the target user for the target content based on the target data and the generalized correlation data;

output, to the screen, the assist information corresponding to the estimated first understanding level of the target user;

estimate a second understanding level of the target user for the target content based on the target data and the content-specific correlation data; and output, to the screen, the assist information corresponding to the estimated second understanding level of the target user after outputting the assist information corresponding to the estimated first understanding level of the target user.

2. The assist system according to claim 1, wherein the statistical processing includes clustering the plurality of sets of sample data based on the viewpoint movement of the sample user and the understanding level of the sample user.

3. The assist system according to claim 1, wherein the statistical processing includes performing regression analysis on the plurality of sets of sample data.

4. The assist system according to claim 1, wherein the at least one processor outputs the assist information after a predetermined time elapses from a point of displaying the target content on the screen.

5. The assist system according to claim 1, wherein the at least one processor outputs the assist information corresponding to the estimated second understanding level of the target user after outputting the assist information corresponding to the estimated first understanding level of the target user.

6. An assist method executable by an assist system comprising at least one processor, the method including:

displaying, on a screen, target content to be visually recognized by a target user;

obtaining, by an eye tracking system including a camera, coordinates of a target user's viewpoint on the screen displaying the target content at each given time interval based on target user's eye movement captured by the camera;

generating target data indicating a viewpoint movement of the target user on the screen displaying the target content, wherein the target data indicates coordinates of a plurality of viewpoints arranged in a time sequence;

referring to a storage unit storing correlation data and assist information, the correlation data indicating a correlation between a user viewpoint movement and a user understanding level for content, the assist information corresponding to the user understanding level for the content, wherein the correlation data is obtained through statistical processing of a plurality of sets of sample data, the plurality of sets of sample data are obtained from a plurality of sample users having visually recognized sample content, and each of the plurality of sets of sample data indicates a pair of:

a viewpoint movement of a sample user among the plurality of the sample users having visually recognized the sample content; and an understanding level of the sample user for the sample content;

estimating a target user understanding level for the target content based on the target data and the correlation data; and outputting, to the screen, the assist information corresponding to the target user understanding level estimated, wherein the correlation data includes:

generalized correlation data obtained by performing the statistical processing on a plurality of sets of first sample data including the sample data obtained from the sample users having visually recognized the sample content different from the target content; and content-specific correlation data obtained by performing the statistical processing on a plurality of sets of second sample data obtained from a plurality of sample users having visually recognized the target content as sample content, and the method includes:

estimating a first understanding level of the target user for the target content based on the target data and the generalized correlation data;

outputting, to the screen, the assist information corresponding to the estimated first understanding level of the target user;

estimating a second understanding level of the target user for the target content based on the target data and the content-specific correlation data; and outputting, to the screen, the assist information corresponding to the estimated second understanding level of the target user after outputting the assist information corresponding to the estimated first understanding level of the target user.

7. The assist method according to claim 6, wherein the statistical processing includes clustering the plurality of sets of sample data based on the viewpoint movement of the sample user and the understanding level of the sample user.

8. The assist method according to claim 6, wherein the statistical processing includes performing regression analysis on the plurality of sets of sample data.

9. The assist method according to claim 6, including outputting the assist information after a predetermined time elapses from a point of displaying the target content on the screen.

10. The assist method according to claim 6, including outputting the assist information corresponding to the estimated second understanding level of the target user after outputting the assist information corresponding to the estimated first understanding level of the target user.

11. A non-transitory computer-readable medium storing a program that, when executed, causes a computer to execute:

displaying, on a screen, target content to be visually recognized by a target user;

obtaining, by an eye tracking system including a camera, coordinates of a target user's viewpoint on the screen displaying the target content at each given time interval based on target user's eye movement captured by the camera;

generating target data indicating a viewpoint movement of the target user on the screen displaying the target content, wherein the target data indicates coordinates of a plurality of viewpoints arranged in a time sequence;

referring to a storage unit storing correlation data and assist information, the correlation data indicating a correlation between a user viewpoint movement and a user understanding level for content, the assist information corresponding to the user understanding level for the content, wherein the correlation data is obtained through statistical processing of a plurality of sets of sample data, the plurality of sets of sample data are obtained from a plurality of sample users having visually recognized sample content, and each of the plurality of sets of sample data indicates a pair of:

a viewpoint movement of a sample user among the plurality of the sample users having visually recognized the sample content; and an understanding level of the sample user for the sample content;

estimating a target user understanding level for the target content based on the target data and the correlation data; and outputting, to the screen, the assist information corresponding to the target user understanding level estimated, wherein the correlation data includes:

generalized correlation data obtained by performing the statistical processing on a plurality of sets of first sample data including the sample data obtained from the sample users having visually recognized the sample content different from the target content; and content-specific correlation data obtained by performing the statistical processing on a plurality of sets of second sample data obtained from a plurality of sample users having visually recognized the target content as sample content, and the program causes the computer to execute:

estimating a first understanding level of the target user for the target content based on the target data and the generalized correlation data;

outputting, to the screen, the assist information corresponding to the estimated first understanding level of the target user;

estimating a second understanding level of the target user for the target content based on the target data and the content-specif1c correlation data; and outputting, to the screen, the assist information corresponding to the estimated second understanding level of the target user after outputting the assist information corresponding to the estimated first understanding level of the target user.

12. The non-transitory computer-readable medium according to claim 11, wherein the statistical processing includes clustering the plurality of sets of sample data based on the viewpoint movement of the sample user and the understanding level of the sample user.

13. The non-transitory computer-readable medium according to claim 11, wherein the statistical processing includes performing regression analysis on the plurality of sets of sample data.

14. The non-transitory computer-readable medium according to claim 11, wherein the program causes the computer to execute outputting the assist information after a predetermined time elapses from a point of displaying the target content on the screen.

15. The non-transitory computer-readable medium according to claim 11, wherein the program causes the computer to execute outputting the assist information corresponding to the estimated second understanding level of the target user after outputting the assist information corresponding to the estimated first understanding level of the target user.

* * * * *